US010503451B2

(12) United States Patent
Yamada

(10) Patent No.: US 10,503,451 B2
(45) Date of Patent: Dec. 10, 2019

(54) HELPING USER SELECT A PRINTER IN A MULTI-PRINTER SYSTEM TO MINIMIZE PRINTING TIME

(71) Applicant: SEIKO EPSON CORPORATION, Tokyo (JP)

(72) Inventor: Yoichi Yamada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/120,822

(22) Filed: Sep. 4, 2018

(65) Prior Publication Data

US 2019/0073173 A1  Mar. 7, 2019

(30) Foreign Application Priority Data

Sep. 5, 2017 (JP) ................................ 2017-170550

(51) Int. Cl.
*G06F 3/12* (2006.01)

(52) U.S. Cl.
CPC .......... *G06F 3/1261* (2013.01); *G06F 3/1214* (2013.01); *G06F 3/1226* (2013.01); *G06F 3/1273* (2013.01); *G06F 3/1285* (2013.01); *G06F 3/1288* (2013.01); *G06F 3/1292* (2013.01); *G06F 3/126* (2013.01); *G06F 3/1236* (2013.01)

(58) Field of Classification Search
None
See application file for complete search history.

(56) References Cited

U.S. PATENT DOCUMENTS

| 5,625,757 | A | * | 4/1997 | Kageyama | ............ | G06F 3/1207 |
| | | | | | | 358/1.14 |
| 9,826,475 | B1 | * | 11/2017 | Mitsuhashi | ........ | H04N 1/32534 |
| 2008/0225326 | A1 | * | 9/2008 | Kephart | ............. | G06Q 30/0261 |
| | | | | | | 358/1.15 |
| 2017/0289372 | A1 | * | 10/2017 | Matsumoto | ........ | H04N 1/00493 |

FOREIGN PATENT DOCUMENTS

JP  2011-198283 A  10/2011

* cited by examiner

*Primary Examiner* — Thomas D Lee
(74) *Attorney, Agent, or Firm* — Workman Nydegger

(57) ABSTRACT

An information processing apparatus transmits printing data to a printing apparatus and includes: a beacon reception unit that receives a beacon signal including data amount information indicating an amount of data of a printing standby job accumulated in the printing apparatus from the printing apparatus; a distance measurement unit that measures a distance from the printing apparatus which is a transmission source of the beacon signal based on the beacon signal; and a selection unit that selects a printing apparatus which is a transmission destination of the printing data based on the distance and the data amount information of each printing apparatus.

6 Claims, 5 Drawing Sheets

FIG. 5

| RANKING | PRINTER |
|---|---|
| 1 | ***ZZZ |
| 2 | ***AAA |
| 3 | ***YYY |
| 4 | ***XXX |
| ⋮ | ⋮ |
| NG | ***BBB |
| NG | ***CCC |

⇩ UPDATE

| RANKING | PRINTER |
|---|---|
| 1 | ***AAA |
| 2 | ***ZZZ |
| 3 | ***YYY |
| 4 | ***XXX |
| ⋮ | ⋮ |
| NG | ***BBB |
| NG | ***CCC |

⇩ UPDATE

| RANKING | PRINTER |
|---|---|
| 1 | ***AAA |
| 2 | ***ZZZ |
| 3 | ***YYY |
| 4 | ***BBB |
| 5 | ***XXX |
| ⋮ | ⋮ |
| NG | ***CCC |

HELPING USER SELECT A PRINTER IN A MULTI-PRINTER SYSTEM TO MINIMIZE PRINTING TIME

BACKGROUND

1. Technical Field

The present invention relates to an information processing apparatus, a printing control method, a non-transitory computer-readable medium recording a printing control program, a printing apparatus, and a printing system.

2. Related Art

There is disclosed a printing apparatus information display apparatus in which a network communication unit acquires information regarding the degree of congestion of each printer through communication via a network, a display content generation unit selects a degree-of-congestion icon which is a picture display indicating the degree of congestion of the printer based on the information regarding the degree of congestion acquired from the printer, and a display control unit displays information regarding the degree-of-congestion icon on an operation screen based on display data from the display content generation unit (see JP-A-2011-198283).

A user desires to obtain a printing result as quickly as possible when printing data is transmitted from an information processing apparatus to any of a plurality of printers to cause any printer to perform printing. At this time, only when the degrees of congestions of printers are displayed as in JP-A-2011-198283, it is not sufficient to select a printer from which the user can obtain a printing result as quickly as possible.

In JP-A-2011-198283, information regarding the degree of congestion of each printer is acquired via a network which is also a transmission path of printing data. Therefore, communication of the network is congested and the printing data can be hindered from being transmitted.

SUMMARY

An advantage of some aspects of the invention is to provide an information processing apparatus, a printing control method, a non-transitory computer-readable medium recording a printing control program, a printing apparatus, and a printing system contributing to appropriate selection of a printing apparatus from which a user can obtain a printing result as quickly as possible.

According to an aspect of the invention, there is provided an information processing apparatus that transmits printing data to a printing apparatus and includes: a beacon reception unit that receives a beacon signal including data amount information indicating an amount of data of a printing standby job accumulated in the printing apparatus from the printing apparatus; a distance measurement unit that measures a distance from the printing apparatus which is a transmission source of the beacon signal based on the beacon signal; and a selection unit that selects a printing apparatus which is a transmission destination of the printing data based on the distance and the data amount information of each printing apparatus.

According to the configuration, the information processing apparatus selects the printing apparatus which is a transmission destination of the printing data based on the data amount information included in the beacon signal received from the printing apparatus and the distance from the printing apparatus detected on the basis of the beacon signal. That is, the optimum printing apparatus from which a user can obtains a printing result as quickly as possible can be selected in consideration of not only the amount of data of the standby printing job in the printing apparatus but also the distance between the information processing apparatus and the printing apparatus (a movement distance of the user to the printing apparatus). The data amount information of the printing apparatus can be obtained by transmitting and receiving a beacon signal different from a beacon signal of communication normally used to transmit the printing data. Therefore, congestion of a transmission path of the printing data is not caused.

In the information processing apparatus, the beacon reception unit may receive the beacon signal in conformity to a communication standard for Bluetooth (registered trademark) Low Energy (BLE).

According to the configuration, the information processing apparatus can acquire the data amount information from the printing apparatus through the wireless communication conforming to the communication standard of BLE and different from the communication used to transmit the printing data and can measure the distance.

In the information processing apparatus, the selection unit may give higher first evaluation to a printing apparatus of which the amount of data indicated by the data amount information is less, give higher second evaluation to a printing apparatus from which the distance is shorter, determines evaluation of each printing apparatus based on the first evaluation and the second evaluation, and preferentially select the printing apparatus of which the determined evaluation is higher.

According to the configuration, the information processing apparatus can accurately select the printing apparatus of which the amount of data of the standby printing jobs is less and which is located at a closer position.

In the information processing apparatus, the selection unit may convert the amount of data indicated by the data amount information into a printing time, convert the distance into a movement time of a user, and preferentially select the printing apparatus of which a value obtained by subtracting the movement time from the printing time is less.

According to the configuration, the information processing apparatus can accurately select the printing apparatus in which a standby time of a user is less from a time at which the user arrives at the printing apparatus.

In the information processing apparatus, the selection unit may exclude the printing apparatus of which the distance is equal to or greater than a predetermined threshold from a target of the evaluation.

According to the configuration, the information processing apparatus can reduce a movement burden of the user so that the printing apparatus located at a distant position equal to or greater than a given position is not selected.

The technical idea of the invention is also realized other than the information processing apparatus. For example, each of a method (a printing control method) including each process (each stage) performed by the information processing apparatus, a program (a printing control program) causing a computer to perform the method, and a computer-readable storage medium that stores the program is also embodied as an aspect of the invention.

A printing apparatus to which printing data is transmitted is also embodied as an aspect of the invention.

According to another aspect of the invention, there is provided a printing apparatus including: an accumulation unit that accumulates printing data transmitted from outside; a printing unit that performs printing based on the printing data accumulated in the accumulation unit; and a beacon transmission unit that transmits a beacon signal including data amount information indicating an amount of data of a standby printing job accumulated in the accumulation unit.

According to the configuration, the printing apparatus transmits the beacon signal including the data amount information, so that the printing apparatus can be selected easily and appropriately from the outside.

In the printing apparatus, the amount of data indicted by the data amount information may be one of the number of standby printing jobs and the number of sheets of printing in accordance with the standby printing job.

According to the configuration, the printing apparatus can notify the outside of information used to appropriately ascertain the amount of data of the current standby printing jobs in the printing apparatus by the beacon signal.

In the printing apparatus, the number of standby printing jobs may be a number based on a result obtained by counting the number of jobs by which text data is printed and the number of jobs by which image data is printed at different ratios.

According to the configuration, the printing apparatus can notify the outside of information used to appropriately ascertain the amount of data of the current standby printing jobs in the printing apparatus by also reflecting a difference in a property of the job by the beacon signal.

In the printing apparatus, the amount of data indicated by the data amount information may be the number of jobs obtained by excluding the number of standby printing jobs which are printing targets when a printing instruction is received in a state in which the jobs are accumulated in the accumulation unit, from the number of standby printing jobs.

According to the configuration, the printing apparatus can notify the outside of the number of jobs which is the number of current standby printing jobs in the printing apparatus and is highly likely to be actually processed (meanwhile, the user stands by) by the beacon signal.

In the printing apparatus, the amount of data indicated by the data amount information may be the number of jobs obtained by excluding the number of kinds of jobs processed in parallel with printing from the number of jobs which stand by for processing in the printing apparatus.

According to the configuration, the printing apparatus can notify the outside of the number of jobs which is the number of jobs currently standing by for processing in the printing apparatus and actually has an influence on a standby time of a user who desires to execute printing by the beacon signal.

Of course, each of a method including each process (each stage) performed by the printing apparatus, a program causing a computer to perform the method, and a computer-readable storage medium that stores the program is also embodied as an aspect of the invention. Further, a printing system including the information processing apparatus and the printing apparatus is also embodied as an aspect of the invention.

BRIEF DESCRIPTION OF THE DRAWINGS

The invention will be described with reference to the accompanying drawings, wherein like numbers reference like elements.

FIG. 5 is a diagram exemplifying updating of a printer ranking list.

DESCRIPTION OF EXEMPLARY EMBODIMENTS

Hereinafter, embodiments of the invention will be described with reference to the drawings. The drawings are merely exemplary to describe the embodiments.

1. Description of Overview of Apparatus Configuration

Figure 1:
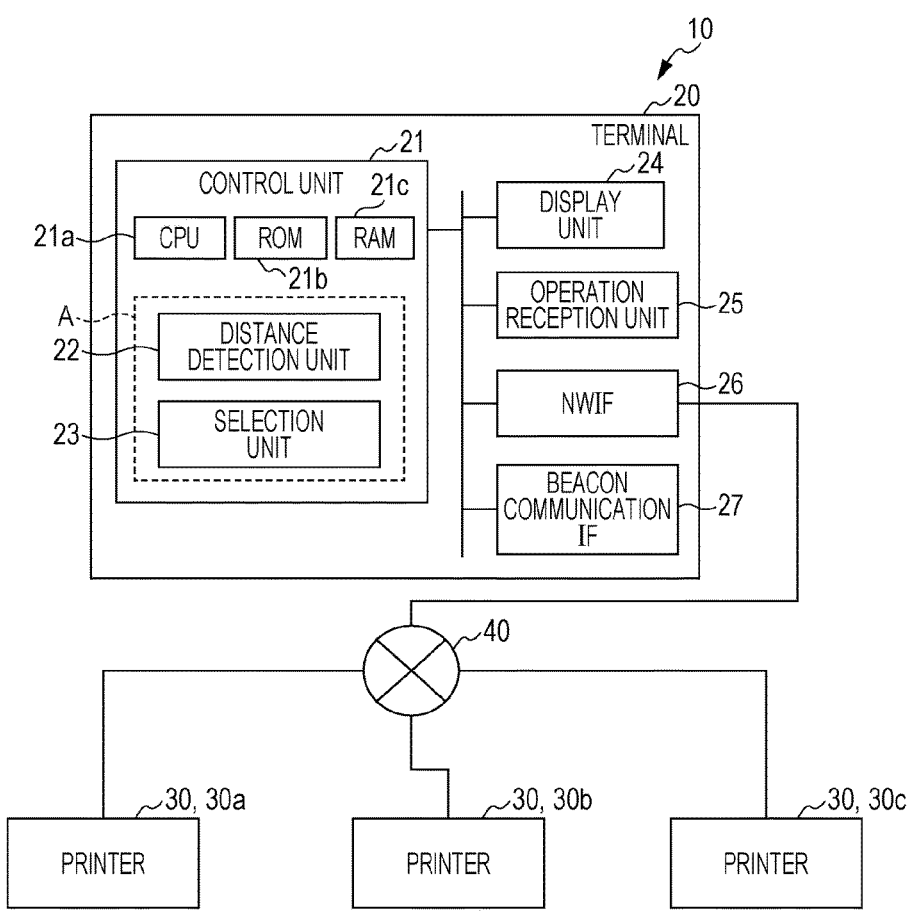
FIG. 1 is a diagram schematically illustrating a configuration example of a system.

FIG. 1 schematically illustrates a configuration example of a printing system 10 including an information processing apparatus 20 and a printer 30. In the example of FIG. 1, the printing system 10 includes a plurality of printers 30 (for example, printers 30a, 30b, 30c, . . . ). The printer 30 corresponds to a printing apparatus according to an aspect of the invention. The printer 30 is an apparatus that has at least a printing function and may be a multifunctional apparatus that also has functions such as a copy function or a facsimile function in addition to the printing function.

The information processing apparatus 20 corresponds to any of various terminals such as a personal computer (PC), a mobile phone, a smartphone, and a tablet terminal. Hereinafter, the information processing apparatus 20 is also referred to as a terminal 20.

In the example of FIG. 1, the terminal 20 includes a control unit 21, a display unit 24, an operation reception unit 25, a network interface (NWIF) 26, and a beacon communication IF 27. The control unit 21 appropriately includes, for example, a memory and a single IC that includes a CPU 21a, ROM 21b, and a RAM 21c or a plurality of ICs. In the control unit 21, the CPU 21a controls an action of the terminal 20 by performing a calculation process in accordance with a program stored in the ROM 21b or the like using a RAM 21c or the like as a work area.

The control unit 21 loads a program A as the kind of program to realize various functions of a distance measurement unit 22, a selection unit 23, and the like in accordance with the program A. The program A corresponds to a printing control program. The control unit 21 performs a printing control method.

The display unit 24 is a unit that displays visual information and is configured with, for example, a liquid crystal display (LCD) or an organic EL display. The display unit 24 may include a display and a driving circuit that drives the display. The operation reception unit 25 is a unit that receives an operation by a user and is realized by, for example, a physical button, a touch panel, a mouse, or a keyboard. Of course, the touch panel may be realized by one function of the display unit 24. The touch panel may also be referred to as an operation panel or the like, including the display unit 24 and the operation reception unit 25.

The NWIF 26 is an IF that is connected to the network 40 in conformity to a predetermined network communication protocol and communicates with the outside. The network 40 is preferably a local area network (LAN) formed in an office, a home, or the like. Each printer 30 can also be connected to the network 40. The terminal 20 or the printer 30 can be each connected to the network 40 in a wired or wireless (for example, the Wi-Fi scheme) way to communicate with each other via the network 40.

The beacon communication IF 27 is an IF that can perform wireless communication with lower power consumption than a wireless communication such as the Wi-Fi scheme. Herein, the beacon communication IF 27 is assumed to be able to perform wireless communication (BLE communication) in conformity to a BLE communication standard. The communication standard conformed by the beacon communication IF 27 may be a Bluetooth communication standard earlier than Bluetooth 3.0.

Figure 2:
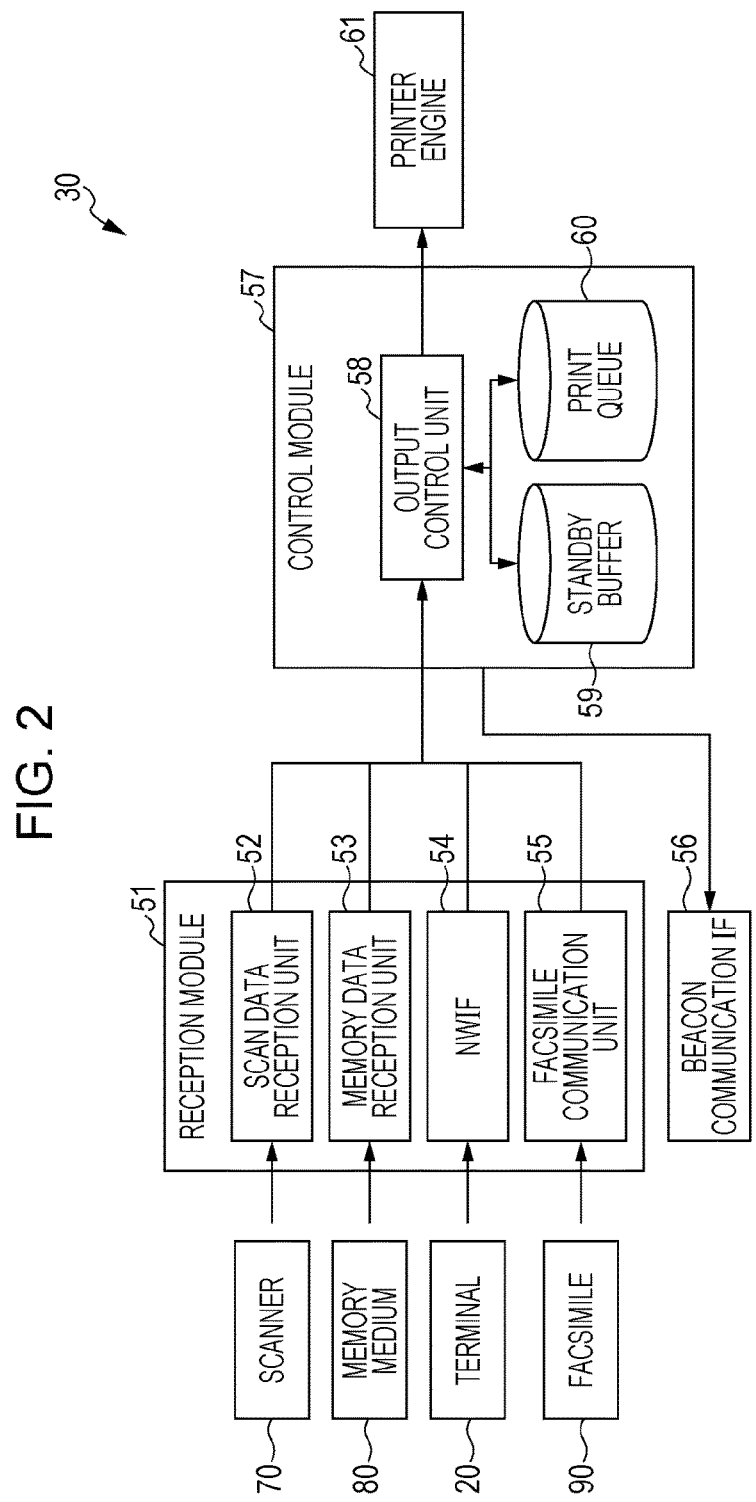
FIG. 2 is a diagram schematically illustrating a configuration example of a printer.

FIG. 2 schematically illustrates a configuration example of the printer 30. Each printer 30 (30a, 30b, 30c, . . . ) exemplified in FIG. 1 may be construed to have the same configuration. The printer 30 includes a reception module 51, a beacon communication IF 56, a control module 57, and a printer engine 61. Each of the modules 51, 56, and 57 is a function realized by cooperating program with hardware (for example, a single IC including a CPU, a ROM, and a RAM or a plurality of ICs, another storage device, various adapters, and the like) included in the printer 30.

The reception module 51 functions as an IF for inputting a printing job from the outside and can frequently input a printing job from a plurality of input systems. In the example of FIG. 2, the reception module 51 includes a scan data reception unit 52, a memory data reception unit 53, an NWIF 54, and a facsimile communication unit 55.

The scan data reception unit 52 receives scan data generated when a scanner 70 optically reads a document as a kind of printing job from the scanner 70.

The memory data reception unit 53 reads memory data (an image file) stored in the storage medium 80 (for example, an SD card, a USB memory, or another memory) connected to a connector (not illustrated) included in the printer 30 as a kind of printing job.

The NWIF 54 is connected to the network 40 in conformity to a predetermined network communication protocol to communicate with the outside. The NWIF 54 receives, for example, a printing job transmitted from the terminal 20 via the network 40.

The facsimile communication unit 55 receives a facsimile signal transmitted from the external facsimile 90 as a kind of printing job.

The printing job includes various commands or printing data in which a printing target (a text or an image such as a photo, a graphic) is expressed with a predetermined format and is finally analyzed by the printer engine 61 to be printed. Here, the printing job may not necessarily be expressed with a format which can already be analyzed by the printer engine 61 from the beginning (at the time of reception by the reception module 51).

The scanner 70 may be an external apparatus of the printer 30 or may be one function which the printer 30 also has. Of course, the facsimile communication unit 55 can also transmit a facsimile signal to the external facsimile 90. The printer 30 can be referred to as a multifunctional apparatus when the printer 30 includes the scanner 70 or the facsimile communication unit 55.

The control module 57 includes an output control unit 58, a standby buffer 59, and a print queue 60. The output control unit 58 serves to perform various kinds of control such as reservation of each printing job input from the reception module 51, format conversion, and an output to the printer engine 61. The format conversion mentioned herein is a process of converting a format of a printing job (printing data) into a format which can be analyzed when the printer engine 61 performs printing (as necessary). The standby buffer 59 is a kind of accumulation unit that accumulates printing jobs (printing data) input from the reception module 51. A type of printing job accumulated in the standby buffer 59 is referred to as an "instruction standby printing job" which is a printing target when a printing instruction is given in a state in which the printing job is accumulated in the accumulation unit. A printing job which is not the instruction standby printing job is referred to as a "normal printing job".

Although not illustrated, the printer 30 includes an operation panel that generally includes a display unit and an operation reception unit. A user can select the instruction standby printing job accumulated in the standby buffer 59 and input an instruction to print the selected instruction standby printing job by randomly operating the operation panel of the printer 30. The print queue 60 is a storage unit that queues printing jobs or a standby queuing of printing jobs before the printing jobs are output to the printer engine 61. Accordingly, the print queue 60 can also be referred to as a kind of an accumulation unit that accumulates printing data. Either the instruction standby printing job or the normal printing job is necessarily input to the print queue 60 before the instruction standby printing job or the normal printing job is output to the printer engine 61.

The printer engine 61 is a printing unit that receives a printing job output from the print queue 60 by the output control unit 58, analyzes the received printing job, and performs printing based on the printing data. A printing scheme adopted by the printer engine 61 is any of various schemes such as an ink jet scheme and an electrophotographic scheme.

The beacon communication IF 56 is an IF capable of performing wireless communication with lower power consumption than a wireless communication such as the Wi-Fi scheme similarly to the beacon communication IF 27 of the terminal 20. Here, the beacon communication IF 56 is assumed to perform BLE communication and to be able to transmit and receive the beacon signal. In the embodiment, the beacon communication IF 56 transmits a beacon signal including data amount information indicating an amount of printing data which is accumulated in the printer 30 and stands by for printing under the control of the control module 57. From the viewpoint, the beacon communication IF 56 (and the control module 57) can be said to correspond to a beacon transmission unit of the printing apparatus. A communication standard conformed by the beacon communication IF 56 may be a Bluetooth communication standard earlier than Bluetooth 3.0.

2. Flow of Process For Printing Job In Printer

A flow of a process according to a kind of printing job in the printer 30 will be described in brief.

Printing jobs can be classified into an instruction standby printing job and a normal printing job, as described above. The printer 30 can determine each kind of printing job based on, for example, identification information which is included in advance in a printing job and is used to determine the kind of printing job.

The reception module 51 can receive a printing job from each of the plurality of input systems described above and transmits the received printing job to the control module 57 in sequence. The output control unit 58 of the control module 57 adds the printing job to the end of the print queue 60 when the printing job is input to the print queue 60. The output control unit 58 reads the head printing job in sequence in a queuing order of the print queue 60 among the printing jobs queued in the print queue 60, appropriately performs the format conversion, and outputs the printing job subjected to the format conversion to the printer engine 61. The output control unit 58 deletes the printing job in the print queue 60 from the print queue 60 when the output to the printer engine 61 is completed.

When a normal printing job is input from the reception module 51, the output control unit 58 directly inputs the normal printing job to the print queue 60 without storing the normal printing job in the standby buffer 59. Thus, printing based on the normal printing job is performed by the printer engine 61.

On the other hand, when the instruction standby printing job is input from the reception module 51, the output control unit 58 performs a process as follows.

For example, the instruction standby printing job can be classified into more precise kinds of printing jobs such as a reprinting job, a confirmation printing job, an accumulation printing job, and an authentication printing job.

The reprinting job is a printing job in which printing of all pages of a job is stored in the standby buffer 59 while the printing of all the pages of the job is performed once. When a reprinting job is input to the reception module 51, the output control unit 58 performs a process of storing the reprinting job in the standby buffer 59 and a process of inputting the reprinting job in the print queue 60. Thus, printing based on the reprinting job is performed once by the printer engine 61. The first printing of the reprinting job can be ascertained as printing of a normal printing job.

When an instruction to print the reprinting job is given by a user via the operation panel of the printer 30 after end of the first printing of the reprinting job, the output control unit 58 performs a process of reading the reprinting job from the standby buffer 59 and inputting the reprinting job to the print queue 60. As a result, the second printing of the reprinting job is performed.

The confirmation printing job is a printing job in which printing of all pages of a job is stored in the standby buffer 59 while the printing of all the pages of the job is performed once in a situation in which an instruction to print a plurality of sheets (N) is given (that is, while printing of only one sheet is performed). When the confirmation printing job is input from the reception module 51, the output control unit 58 performs a process of storing the confirmation printing job in the standby buffer 59 and a process of inputting the confirmation printing job in the print queue 60. Thus, printing based on the confirmation printing job is performed once by the printer engine 61 (only one sheet is printed). The first printing (only the first printing) of the confirmation printing job can be ascertained as printing of the normal printing job. When an instruction to print the confirmation printing job is given by the user via the operation panel of the printer 30 after end of the first printing of the confirmation printing job, the output control unit 58 performs a process of reading the confirmation printing job from the standby buffer 59 and inputting the confirmation printing job to the print queue 60. At this time, the output control unit 58 causes the printer engine 61 to print the remaining (N−1) sheets of the confirmation printing job.

The accumulation printing job is a kind of printing job stored in the standby buffer 59 without performing printing. When the accumulation printing job is input from the reception module 51, the output control unit 58 performs a process of storing the accumulation printing job in the standby buffer 59. Thereafter, when an instruction to print the accumulation printing job is given by the user via the operation panel of the printer 30, the output control unit 58 performs a process of reading the accumulation printing job from the standby buffer 59 and inputting the accumulation printing job in the print queue 60. As a result, printing based on the accumulation printing job is performed by the printer engine 61.

The output control unit 58 does not delete the reprinting job, the confirmation printing job, or the accumulation printing job from the standby buffer 59 in principle even after the output of the job to the printer engine 61 is completed. Here, the output control unit 58 deletes the reprinting job, the confirmation printing job, or the accumulation printing job from the standby buffer 59 when an instruction to delete the reprinting job, the confirmation printing job, or the accumulation printing job is given by the user.

The authentication printing job is a kind of printing job stored in the standby buffer 59 without performing printing. When the authentication printing job is input from the reception module 51, the output control unit 58 performs a process of storing the authentication printing job in the standby buffer 59. Thereafter, when an instruction to print the authentication printing job is given by the user via the operation panel of the printer 30, the output control unit 58 performs a necessary authentication process and performs a process of reading the authentication printing job from the standby buffer 59 and inputting the authentication printing job in the print queue 60 only when the authentication is successful. The authentication process is, for example, a process of causing the user to input authentication information (a user ID, a password, or the like) and confirming whether the input authentication information matches pre-registered legitimate authentication information. When the input authentication information matches the legitimate authentication information, the authentication is assumed to be successful. Thus, only a legitimate user (authenticated user) can obtain a printing result by the printer engine 61 based on the authentication printing job. The output control unit 58 deletes the authentication printing job from the standby buffer 59 after the output of the job to the printer engine 61 is completed, unlike the reprinting job, the confirmation printing job, and the accumulation printing job.

3. Transmission of Beacon By Printer

The beacon communication IF 56 of the printer 30 transmits (broadcasts) an advertisement packet (which is a specific example of a beacon signal) at a given time interval through BLE communication under the control of the control module 57.

Figure 3:
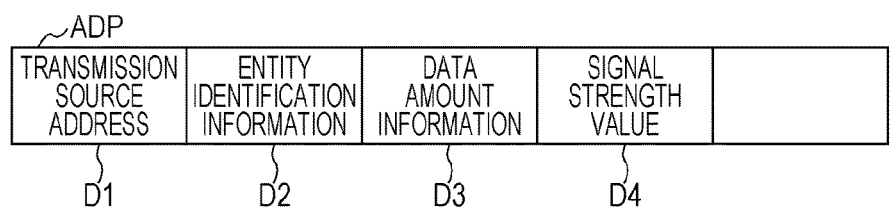
FIG. 3 is a diagram illustrating an example of an advertisement packet.

FIG. 3 illustrates an example of an advertisement packet ADP transmitted through BLE communication by the beacon communication IF 56. In FIG. 3, a header or the like of the advertisement packet ADP is omitted. As illustrated in FIG. 3, the advertisement packet ADP includes a transmission source address D1, entity identification information D2, data amount information D3, and a signal strength value D4.

The transmission source address D1 is a Bluetooth device address of the printer 30 which is a transmission source of the advertisement packet ADP. The entity identification information D2 is identification information used to uniquely identify the printer 30 which is the transmission source of the advertisement packet ADP, for example, a media access control (MAC) address. The signal strength value D4 is a value indicating a reception signal strength at a position distant by a reference distance. The signal strength value D4 may also be referred to as a threshold of reception signal strength. The advertisement packet ADP may further include a name of the printer 30 (printer name) which is the transmission source of the advertisement packet ADP.

The data amount information D3 is information directly or indirectly indicating an amount of data of a standby printing job accumulated in the printer 30 which is the transmission source of the advertisement packet ADP. The control module 57 generates the data amount information D3 and causes the beacon communication IF 56 to transmit the advertisement packet ADP including the generated data amount information D3.

For example, the amount of data indicated by the data amount information D3 is the number of standby printing jobs. That is, the control module 57 sets the number of printing jobs currently input to the print queue 60 and standing by to be output to the printer engine 61 as the data amount information D3.

Alternatively, the amount of data indicated by the data amount information D3 may be the number of sheets of printing in accordance with the standby printing job. Specifically, the control module 57 analyzes each printing job currently input to the print queue 60 and standing by to be output to the printer engine 61 and sets a sum of the number of sheets of the printing to be printed in each printing job which is standing by as the data amount information D3.

Alternatively, when the amount of data indicated by the data amount information D3 is the number of standby printing jobs, the number of jobs may be a number based on a result obtained by counting the number of jobs for printing text data and the number of jobs for printing image data at different ratios. In this case, the control module 57 divides the printing jobs currently input to the print queue 60 and standing by to be output to the printer engine 61 into the printing job for printing the text data and the printing job for printing image data (a photo or CG) to count the printing jobs, and sets a sum of the count result of each number of jobs as the number of standby printing jobs.

At this time, when one printing job for printing the text data is enumerated to the number of jobs=1, the control module 57 sets one printing job for printing the image data to the number of jobs=1×α (where α is an integer greater than 1). Alternatively, when one printing job for printing the image data is enumerated to the number of jobs=1, the control module 57 sets one printing job for printing the text data to the number of jobs=1×β (where β is an integer less than 1). That is, the number of jobs is counted by multiplying the number of printing jobs for printing the image data of which the amount of data to be printed is relatively large by a ratio higher than the number of printing jobs for printing the text data of which the amount of data to be printed is relatively small. In this configuration, the printer 30 can notify the outside of the data amount information D3 used to appropriately ascertain the amount of data of the current standby printing jobs by reflecting a difference (the text data or the image data) in a property of the printing job by the advertisement packet ADP.

The instruction standby printing job accumulated in the standby buffer 59 can also be said to be a kind of standby printing job. However, the instruction standby printing job is not considered as a printing target (the instruction standby printing job is not input to the print queue 60) when a user does not give a printing instruction after storing of the instruction standby printing job in the standby buffer 59. Therefore, the instruction standby printing job does not immediately become a factor that awaits a user who desires to transmit a new printing job to the terminal 20 and causes the printer 30 to print the new printing job. Therefore, when the data amount information D3 is the number of standby printing jobs, as described above, the control module 57 sets the number of jobs obtained by excluding the number of standby printing jobs from the number of standby printing jobs (the number of printing jobs currently input to the print queue 60 and standing by to be output to the printer engine 61+the number of instruction standby printing jobs currently accumulated in the standby buffer 59) as the data amount information D3.

When the printer 30 is a multifunctional apparatus, the printer 30 can process another job in parallel with printing. The job which can be processed in parallel with printing is, for example, any of various jobs such as a "scan to mail job", a "facsimile transmission job", and a "PC scan job". The scan to mail job is a job in which a document set in the scanner 70 is read from the scanner 70 and data obtained through the reading is mail-transmitted to the outside via, for example, the NWIF 54. The facsimile transmission job is a job in which a document set in the scanner 70 is read from the scanner 70 and data obtained through the reading is facsimile-transmitted to the outside by the facsimile communication unit 55. The PC scan job is a process in which an instruction to scan a document is received from a terminal such as an external PC via the NWIF 54, the document set in the scanner 70 is read by the scanner 70 in accordance with the scan instruction, and data obtained through the reading is stored.

Presence of a job which can be processed in parallel with printing by the printer 30 is not mostly a factor that delays a printing process in the printer 30. Accordingly, when the data amount information D3 is the number of jobs standing by to be processed in the printer 30, the control module 57 can set the number of jobs obtained excluding the number of kinds of jobs which can be processed in parallel with printing from the number of jobs currently standing by to be processed in the printer 30 (the number of standby printing jobs+the number of kinds of jobs standing by to be processed in parallel with printing) as the data amount information D3.

By generating the data amount information D3 in accordance with any of the various modes (or a combination of the plurality of modes), the control module 57 can cause the beacon communication IF 56 to transmit the advertisement packet ADP including the data amount information D3 appropriately indicating the degree of current printing standby (how much the user is forced to wait for printing) in the printer 30.

The amount of data of the standby printing jobs in the printer 30, for example, the number of standby printing jobs, changes moment by moment. Accordingly, the data amount information D3 included in the advertisement packet ADP transmitted by the beacon communication IF 56 can differ whenever the advertisement packet ADP is generated (transmitted).

4. Evaluation and Selection of Printer

Figure 4:
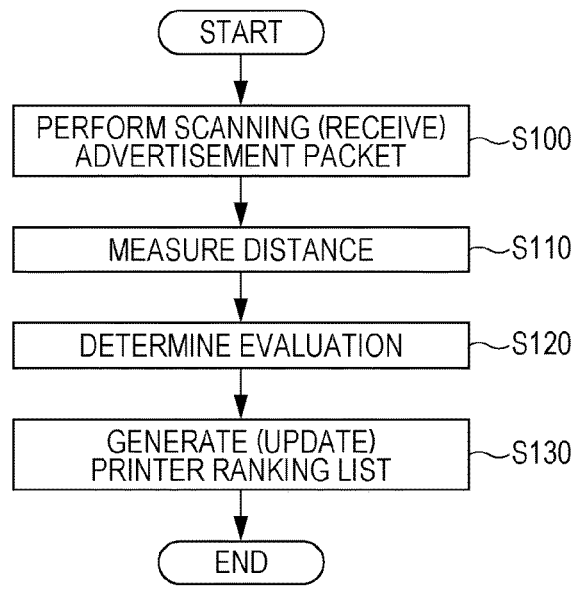
FIG. 4 is a flowchart illustrating a ranking list generation process.

FIG. 4 illustrates a flowchart of a ranking list generation process performed in accordance with the program A by the control unit 21 of the terminal 20. In the ranking list generation process, a printer ranking list for selecting the printer 30 capable of acquiring a printing result as quickly as possible is generated.

First, in step S100, the control unit 21 receives the advertisement packet ADP transmitted through the BLE communication from the surrounding printer 30 by scanning an advertisement packet of a signal which can be recognized via the beacon communication IF 27. For example, when the control unit 21 recognizes specific information indicating an advertisement packet determined with a format of the BLE communication in the header of the signal recognized via the beacon communication IF 27, the control unit 21 can receive the advertisement packet ADP. Step S100 corresponds to a beacon reception stage. In terms of the fact that step S100 can be performed, the control unit 21 and the beacon communication IF 27 can be said to be a beacon reception unit that receive a beacon signal (the advertisement packet ADP) including the data amount information D3 indicating the amount of data of a standby printing job accumulated in the printer 30 from the printer 30.

In step S110, the control unit 21 (the distance measurement unit 22) measures a distance from the printer 30 which is a transmission source of the advertisement packet ADP (hereinafter referred to as a target printer 30) based on the advertisement packet ADP received in step S100 (a distance measurement stage).

For example, the distance measurement unit 22 compares the signal strength value D4 included in the advertisement packet ADP to a reception signal strength [RSSI (received signal strength indication)] of the advertisement packet ADP when the beacon communication IF 27 transmitted through the BLE communication receives the advertisement packet ADP from the target printer 30. Then, the distance measurement unit 22 measures a distance between the terminal 20 and the target printer 30 based on a result of the comparison. In this case, the measured distance may be a specific distance such as several meters or several centimeters. For example, when RSSI≥D4, a distance may be determined to be within predetermined meters from the terminal 20 ("close distance"). When RSSI<D4, the distance may be determined to be beyond the predetermined meters from the terminal 20 ("far distance"). That is, the distance measurement unit 22 may measure any information indicating how much the terminal 20 and the target printer 30 are distant from each other.

The signal strength value D4 included in the advertisement packet ADP may include a plurality of signal strength values. For example, the signal strength value D4 included in the advertisement packet ADP includes a first signal strength value and a second signal strength value greater than the first signal strength value. The distance measurement unit 22 compares the reception signal strength RSSI of the advertisement packet ADP to the signal strength value D4 (the first signal strength value and the second signal strength value) included in the advertisement packet ADP. A distance between the terminal 20 and the target printer 30 may be measured so that the distance is a "considerably close distance" from the terminal 20 when RSSI≥the second signal strength value, the distance is a "close distance" from the terminal 20 when the second signal strength value>RSSI≥the first signal strength value, and the distance is a "far distance" from the terminal 20 when RSSI<the first signal strength value. The distance measurement unit 22 may use the signal strength value D4 previously acquired and stored from several printers 30 (or set in advance, for example, when the product of the terminal 20 is shipped) as the signal strength value D4 to be compared to the reception signal strength RSSI of the advertisement packet ADP. Accordingly, it may not be necessary to include the signal strength value D4 every time in the advertisement packet ADP transmitted by the printer 30.

The distance measurement unit 22 may measure a distance from the target printer 30 as follows. For example, the terminal 20 stores a table in which a correspondent relation between the reception signal strength RSSI of the advertisement packet ADP and a distance from a transmission source of the advertisement packet ADP to a side receiving the advertisement packet ADP is defined, in the RAM 21c or the like in advance. Then, when the advertisement packet ADP is received via the beacon communication IF 27, the distance measurement unit 22 measures a distance from the target printer 30 by reading the distance corresponding to the reception signal strength RSSI with reference to the table.

In step S120, the control unit 21 (the selection unit 23) determines evaluation of the target printer 30 based on the data amount information D3 included in the advertisement packet ADP received in step S100 and a distance between the terminal 20 and the target printer 30 (hereinafter referred to as a measured distance) detected in step S110. The evaluation mentioned here means the degree of preference for a transmission destination of a printing job (printing data). That is, the printer 30 with higher evaluation is selected more easily as a transmission destination of the printing data or can be said to be more appropriate as the transmission destination of the printing data in consideration of convenience for a user. Hereinafter, several evaluation methods in step S120 will be exemplified. The selection unit 23 may perform any evaluation method.

Evaluation Method 1

The selection unit 23 determines higher first evaluation as the amount of data indicated by the data amount information D3 is less, determines higher second evaluation as the measured distance is shorter, and determines final evaluation based on the first evaluation and the second evaluation. More specifically, the selection unit 23 evaluates a first evaluation score in accordance with the amount of data indicated by the data amount information D3 (the number of jobs or the number of sheets described above). Based on the correspondent relation between the score and the amount of data determined in advance, the higher first evaluation score is given as the amount of data indicated by the data amount information D3 is less. Further, the selection unit 23 evaluates a second evaluation score according to the measured distance. Based on the correspondent relation between the score and the measured distance determined in advance, the higher second evaluation score is given as the measured distance is shorter. Then, the selection unit 23 finally evaluates a sum score of the first evaluation score and the second evaluation score. The selection unit 23 may determine the final evaluation by weightedly adding the first evaluation score and the second evaluation score at a predetermined ratio.

Evaluation Method 2

The selection unit 23 converts the amount of data indicated by the data amount information D3 into a printing time, converts the measured distance into a movement time of a user, and determines a higher evaluation as a value obtained by subtracting the movement time from the printing time is less. More specifically, the selection unit 23 converts the amount of data indicated by the data amount information D3 into a printing time based on a first conversion formula for converting an amount of data determined in advance into a time (printing time) necessary for printing. Further, the selection unit 23 converts the measured distance into a movement time based on a second conversion formula for converting a distance determined in advance into a movement time taken for a user to walk. Then, the selection unit 23 determines higher evaluation as a time obtained by subtracting the movement time from the converted printing time (hereinafter referred to as a user standby time) is shorter. The user standby time is substantially equivalent to a time from a time at which the user who uses the terminal 20 to perform an operation necessary for printing a desired printing job arrives in front of the target printer 30 and to a time at which the printing of the printing job starts in the target printer 30. The user standby time can be mathematically equal to or less than 0 in some cases. Of course, higher evaluation is given to the user standby time equal to or less than 0 than the user standby time exceeding 0.

Needless to say that the selection unit 23 evaluates all the printers 30 in accordance with Evaluation Method 1 when Evaluation Method 1 is adopted, and the selection unit 23 evaluates all the printers 30 in accordance with Evaluation Method 2 when Evaluation Method 2 is adopted.

In step S130, the selection unit 23 generates a printer ranking list PL using the evaluation for the target printer 30 determined in step S120. The printer ranking list PL is a list in which the control unit 21 of the terminal 20 determines preference ranking among the printers 30 determined to be evaluated when reception of the advertisement packet ADP via the beacon communication IF 27, described above, is used as an opportunity. The printer ranking list PL is stored in a memory such as the RAM 21c.

FIG. 5 exemplifies updating of the printer ranking list PL. The printer ranking list PL is a list in which higher ranking is given to the printer 30 with higher evaluation. In the printer ranking list PL, each printer 30 is identified with, for example, a printer name or entity identification information to be managed. "*AAA" or "*ZZZ" illustrated in FIG. 5 is, for example, a printer name or entity identification information and indicates the individual printer 30 in the printer ranking list PL.

In step S130, the selection unit 23 adds a target printer to the printer ranking list PL when the target printer 30 determined to be evaluated in step S120 is not listed in the current printer ranking list PL. At this time, the selection unit 23 determines ranking of the target printer according to comparison between evaluation of the target printer and the evaluation of other printers 30 listed in the current printer ranking list PL and reflects the ranking of the target printer in the printer ranking list PL. When the target printer is listed in the current printer ranking list PL, the selection unit 23 changes the ranging of the target printer (as necessary). That is, the selection unit 23 changes the ranking of the target printer according to comparison between the evaluation of the target printer and evaluation of the other printers 30 listed in the current printer ranking list PL and reflects the ranking of the target printer in the printer ranking list PL. The generation of the printer ranking list PL in step S130 can also be expressed as updating of the printer ranking list PL.

For example, the printer ranking list PL illustrated on the upper side of FIG. 5 is assumed to be updated to the printer ranking list PL illustrated in the middle of FIG. 5 through the process of step S130. The updating indicates an example in which recent results of steps S100 to S120 for the target printer "*AAA" with the second rank until that time are received and the ranking of the target printer "*AAA" is moved up to the first rank (accordingly, the printer "***ZZZ" with the first rank until that time is moved down to the second rank).

The control unit 21 of the terminal 20 performs the ranking list generation process (see FIG. 4) when the advertisement packets ADP are received from several printers 30 via the beacon communication IF 27. As described above, the data amount information D3 included in the advertisement packet ADP transmitted by the printer 30 can differ at each time. The data amount information D3 included in the advertisement packet ADP transmitted by each of the different printers 30, of course also differ. When the terminal 20 is a mobile terminal such as a smartphone or a laptop type PC (a mobile terminal wirelessly connected to the network 40), a positional relation between the terminal 20 and each printer 30 is also frequently changed. Accordingly, the control unit 21 repeatedly performs the ranking list generation process (see FIG. 4) and updates the printer ranking list PL several times. Therefore, the printer ranking list PL has content in which the amount of data of a recent standby printing job in each printer 30 and the distance between the terminal 20 and each printer 30 are reflected at a substantially constant time.

Here, the selection unit 23 may exclude the target printer 30 from which the measured distance obtained in step S110 is equal to or greater than a predetermined threshold from the evaluation target in step S120. Various measured distances equal to or greater than the predetermined threshold can be set. For example, when the distance is considered to be the "far distance" according to the comparison between the signal strength value D4 and the reception signal strength RSSI of the advertisement packet ADP, the distance is assumed to be the measured distance equal to or greater than the predetermined threshold. When the measured distance obtained in step S110 is equal to or greater than the predetermined threshold, the selection unit 23 performs step S130 without performing step S120. Here, ranking of the target printer 30 excluded from the evaluation target in step S120 is not given in the printer ranking list PL (substantially, the lowest ranking is given). The selection unit 23 deprives the target printer 30 of the ranking given until that time in step S130, for example, when the measured distance is equal to or greater than the predetermined threshold as the recent results of steps S100 and S110 on the target printer 30 to which the ranking is given in the printer ranking list PL until that time. In FIG. 5, the printer of which ranking is "NG" is a printer to which ranking is not given in this way.

The printer ranking list PL illustrated in the middle of FIG. 5 is assumed to be updated to the printer ranking list PL illustrated on the lower side of FIG. 5 through the process of step S130. The updating indicates an example in which recent results of steps S100 to S120 for the target printer "*BBB" with the "NG" ranking until that time are received and the ranking of the target printer "*BBB" is moved up to fourth ranking (accordingly, the printer "*XXX" with the fourth rank until that time is moved down to fifth rank). The ranking list generation process (see FIG. 4**) has been described above.

Figure 6:
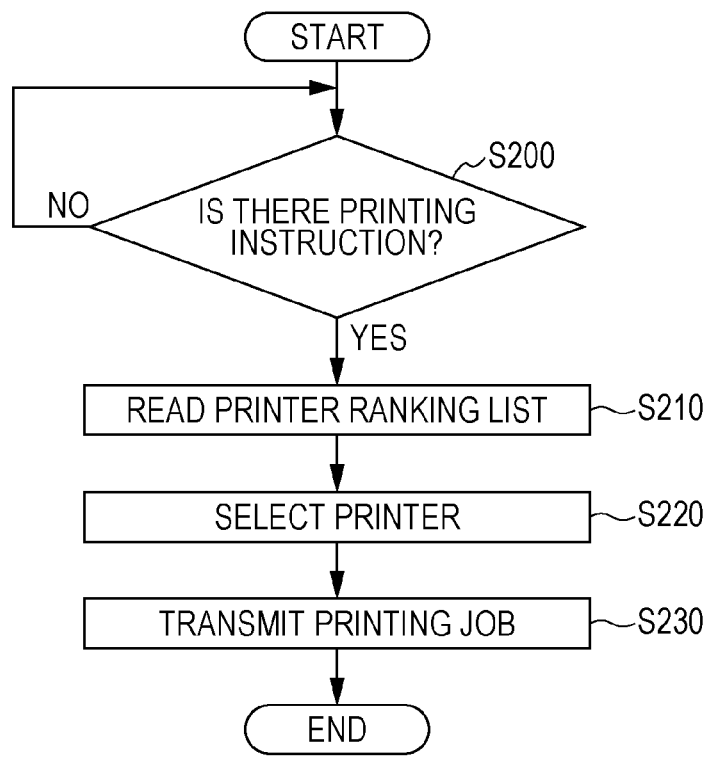
FIG. 6 is a flowchart illustrating a printer selection process.

FIG. 6 illustrates a flowchart of a printer selection process performed in accordance with the program A by the control unit 21 of the terminal 20. The control unit 21 performs the ranking list generation process (see FIG. 4) and the printer selection process (see FIG. 6) as independent processes.

The control unit 21 determines whether a printing instruction is received (step S200). When the printing instruction is determined to be received ("Yes" in step S200), the process proceeds to step S210. That is, when a user input an instruction to print a file (a file expressing a printing target such as text and an image) generated with any application software via the operation reception unit 25, the control unit 21 receives the instruction to print the file. Since the printing instruction determined to be given in step S200 is a printing instruction before transmission of the printing job from the terminal 20 to the printer 30, the printing instruction is different from an instruction to print the instruction standby printing job stored in the standby buffer 59 of the printer 30.

In step S210, the control unit 21 (the selection unit 23) reads the recent printer ranking list PL from the RAM 21c or the like. In step S220, the selection unit 23 selects the printer 30 which is a transmission destination of a printing job with reference to the read printer ranking list PL (a selection stage). In step S220, the selection unit 23 selects the printer 30 with the highest rank (first rank) in the printer ranking list PL in principle. Here, depending on the printing instruction recognized to be received in step S200, for example, the plurality of printers 30 are selected in some cases. In this case, the selection unit 23 preferentially selects the plurality of printers 30 from the highest ranking in the printer ranking list PL (step S220). The printer 30 which does not correspond to a printing condition (for example, a sheet size, duplex printing, borderless printing, or color printing) determined by the printing instruction recognized to be received in step S200 can be listed. Therefore, the selection unit 23 may select the printer 30 which can correspond to the printing condition determined with the printing instruction and has higher ranking in the printer ranking list PL (step S220).

In any case, it can be said that the selection unit 23 selects the printer 30 which is a transmission destination of the printing job (printing data) based on the data amount information D3 and the measured distance of each printer 30 by performing steps S120 and S130 (see FIG. 4) and steps S200 to S220 (see FIG. 6). It can be said that the selection unit 23 preferentially selects the printer 30 with the higher evaluation determined in step S120 in step S220. The selection unit 23 does not select the printer 30 (the printer with "NG" in the example of FIG. 5) to which ranking is not given in the referred printer ranking list PL in step S220.

In step S230, the control unit 21 transmits the printing job to the printer 30 selected in step S220 via the NWIF 26 and the network 40 (a transmission stage). That is, the control unit 21 appropriately performs known image processing on the file in the printing instruction recognized to be received in step S200 to generate printing data and transmits the printing job including the printing data to the selected printer 30 via the network 40. In this way, the printer selection process (see FIG. 6) ends. As a result, the side of the selected printer 30 receives the printing job via the NWIF 54 (see FIG. 2).

As understood from the above description, the control unit 21 (the selection unit 23) automatically selects the optimum printer 30 (from which the user can obtain a printing result as quickly as possible) with reference to the recent printer ranking list PL (steps S210 and S220). Accordingly, according to the embodiment, the user can be free from a burden of selecting the printer 30 considered to be optimum among the plurality of printers 30.

In the embodiment, it is not excluded that the user selects the printer 30. For example, the control unit 21 may cause the display unit 24 to display the recent printer ranking list PL at a timing before the printing instruction is determined to be given in step S200 or a timing after the printing instruction is determined to be given in step S200. The user operates the operation reception unit 25 to select several printers 30 in the printer ranking list PL with reference to the printer ranking list PL displayed on the display unit 24 and to input the selection instruction. The selection unit 23 receives the instruction to select the printers 30 by the user and selects the printer 30 according to the selection instruction (step S220). In this way, even in a mode in which the printer ranking list PL may be presented to the user so that the user can select the printer 30, the printer ranking list PL is generated according to the evaluation based on the measured distance and the data amount information D3 of each printer 30. Therefore, it can be said that the selection unit 23 selects the printer 30 which is a transmission destination of the printing data based on the measured distance and the data amount information D3 of each printer 30.

5. Conclusion

According to the embodiment, the information processing apparatus (the terminal) 20 transmitting the printing data to the printer 30 includes the beacon reception unit (21 or 27) that receives the beacon signal (the advertisement packet ADP) including the data amount information D3 indicating the amount of data of the standby printing job accumulated in the printer 30 from the printer 30, the distance measurement unit 22 that measures the distance from the printer 30 which is a transmission source of the beacon signal based on the beacon signal, and the selection unit 23 that selects the printer 30 which is a transmission destination of the printing data based on the measured distance and the data amount information D3 of each printer 30. That is, the terminal 20 selects the optimum printer 30 from which the user can obtain the printing result as quickly as possible by considering not only the amount of data of the standby printing job in the printer 30 but also the distance between the terminal 20 and the printer 30 (a movement distance of the user up to the printer 30). Since the data amount information D3 of the printer 30 can be obtained through the beacon signal (for example, transmission and reception of the beacon signal through the BLE communication) rather than the network 40 used to transmit the printing data, a transmission path of the printing data is not congested.

According to the embodiment, the selection unit 23 of the terminal 20 gives the higher first evaluation to the printer 30 of which the amount of data indicated by the data amount information D3 is less, gives the higher second evaluation to the printer 30 from which the distance is shorter, determines evaluation of each printer 30 based on the first evaluation and the second evaluation (Evaluation Method 1), and preferentially selects the printer 30 of which the determined evaluation is higher. In this configuration, the terminal 20 can accurately select the printer 30 of which the amount of data of the standby printing job is small and which is located closer to the terminal 20, and thus it is possible to improve convenience for the user.

According to the embodiment, the selection unit 23 of the terminal 20 converts the amount of data indicated by the data amount information D3 into the printing time, converts the measured distance into the movement time of the user, and preferentially selects the printer 30 of which the value obtained by subtracting the movement time from the printing time is less. In this configuration, the terminal 20 can accurately select the printer 30 in which the user standby time is as small as possible, and thus it is possible to improve convenience for the user.

According to the embodiment, the selection unit 23 of the terminal 20 excludes the printer 30 from which measured distance is equal to or greater than the predetermined threshold from the evaluation target. In this configuration, by not performing step S120 (see FIG. 4) on the printer 30 located at a far position equal to or greater than a given position from the terminal 20, it is possible to suppress a process amount of the terminal 20. By causing the printer 30 located at the far position equal to or greater than the given position from the terminal 20 not to be selected as a transmission destination of the printing data, it is possible to reduce a movement burden on the user.

According to the embodiment, the printer 30 includes the accumulation unit (59 or 60) that accumulates the printing data transmitted from the outside, the printing unit (61) that performs printing based on the printing data accumulated in the accumulation unit, and the beacon transmission unit (57 or 56) that transmits the beacon signal (the advertisement packet ADP) including the data amount information D3 indicating the amount of data of the standby printing job accumulated in the accumulation unit. In this configuration, the printer 30 transmits the beacon signal including the data amount information D3, so that the printer 30 can be easily and appropriately selected from the outside.

According to the embodiment, the amount of data indicated by the data amount information D3 is one of the number of standby printing jobs and the number of sheets of printing in accordance with the standby printing job. When the amount of data indicated by the data amount information D3 is the number of jobs, the number of standby printing jobs may be a number based on a result obtained by counting the number of jobs by which text data is printed and the number of jobs by which image data is printed at different ratios. In this configuration, the printer 30 can notify the outside of the data amount information D3 used to appropriately ascertain the amount of data of the current standby printing jobs in the printer 30 by the beacon signal.

According to the embodiment, the amount of data indicated by the data amount information D3 is the number of jobs obtained by excluding the number of standby printing jobs which are printing targets when a printing instruction is received in a state in which the jobs are accumulated in the accumulation unit (the standby buffer 59), from the number of standby printing jobs in the printer 30. In this configuration, the printer 30 can notify the outside of the number of jobs which is the number of current standby printing jobs in the printer 30 and is highly likely to be actually processed (meanwhile, the user stands by) by the beacon signal.

According to the embodiment, the amount of data indicated by the data amount information D3 is the number of jobs obtained by excluding the number of kinds of jobs processed in parallel with printing from the number of jobs which stand by for processing in the printer 30. In this configuration, the printer 30 can notify the outside of the number of jobs which is the number of jobs currently standing by for processing in the printer 30 and actually has an influence on a standby time of a user who desires to execute printing from now by the beacon signal.

In the embodiment, the beacon signal including the data amount information D3 of the printer 30 and transmitted from the printer 30 may be transmitted in accordance with a wireless communication technology other than BLE communication. In the above-described embodiment, the example in which the CPU (processor) performs each process has been described. Here, in the present specification, the CPU may be configured with a single CPU or a plurality of CPUs or may be configured with a single integrated circuit (for example, an application specific integrated circuit (ASIC)) or a plurality of integrated circuits. The CPU may be configured with a combination of a single CPU or a plurality of CPUs and a single integrated circuit or a plurality of integrated circuits.

The entire disclosure of Japanese Patent Application No. 2017-170550, filed Sep. 5, 2017 is expressly incorporated by reference herein.

What is claimed is:

1. An information processing apparatus that transmits printing data to a printing apparatus, the information processing apparatus comprising:
   at least one IC that is configured to:
      receive a beacon signal including data amount information indicating an amount of data of a printing standby job accumulated in the printing apparatus from the printing apparatus;
      measure a distance from the printing apparatus which is a transmission source of the beacon signal based on the beacon signal; and
      select a printing apparatus which is a transmission destination of the printing data based on the distance and the data amount information of each printing apparatus,
   wherein the at least one IC gives higher first evaluation to a printing apparatus of which the amount of data indicated by the data amount information is less, gives higher second evaluation to a printing apparatus from which the distance is shorter, determines evaluation of each printing apparatus based on the first evaluation and the second evaluation, and preferentially selects the printing apparatus of which the determined evaluation is higher.

2. The information processing apparatus according to claim 1,
   wherein the at least one IC receives the beacon signal in conformity to a communication standard for Bluetooth Low Energy.

3. The information processing apparatus according to claim 1,
   wherein the at least one IC converts the amount of data indicated by the data amount information into a printing time, converts the distance into a movement time of a user, and preferentially selects the printing apparatus of which a value obtained by subtracting the movement time from the printing time is less.

4. The information processing apparatus according to claim 1,
   wherein the at least one IC excludes the printing apparatus of which the distance is equal to or greater than a predetermined threshold from a target of the evaluation.

5. A printing apparatus comprising:
   at least one IC that is configured to
      accumulate printing data transmitted from outside;
      control a printing unit that performs printing based on the printing data accumulated in the at least one IC; and
      transmit a beacon signal including data amount information indicating an amount of data of a standby printing job accumulated in the at least one IC,
   wherein the amount of data indicated by the data amount information is the number of jobs obtained by excluding the number of standby printing jobs which are printing targets when a printing instruction is received in a state in which the jobs are accumulated in the at least one IC, from the number of standby printing jobs.

6. A printing apparatus comprising:
   at least one IC configured to:
      accumulate printing data transmitted from outside;
      control a printing unit that performs printing based on the printing data accumulated in the at least one IC;
      transmit a beacon signal including data amount information indicating an amount of data of a standby printing job accumulated in the at least one IC,
   wherein the amount of data indicated by the data amount information is the number of jobs obtained by excluding the number of kinds of jobs processed in parallel with printing from the number of jobs which stand by for processing in the printing apparatus.

* * * * *